US012696266B2

(12) United States Patent
Dong et al.

(10) Patent No.: US 12,696,266 B2
(45) Date of Patent: Jul. 28, 2026

(54) METHOD FOR UPLINK TRANSMISSION AND DEVICE THEREOF

(71) Applicant: ZTE CORPORATION, Guangdong (CN)

(72) Inventors: Fei Dong, Guangdong (CN); He Huang, Guangdong (CN); Li Niu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 321 days.

(21) Appl. No.: 18/178,260

(22) Filed: Mar. 3, 2023

(65) Prior Publication Data

US 2023/0284216 A1     Sep. 7, 2023

Related U.S. Application Data

(63) Continuation of application No. PCT/CN2021/070318, filed on Jan. 5, 2021.

(51) Int. Cl.
| | |
|---|---|
| *H04W 72/1268* | (2023.01) |
| *H04L 1/08* | (2006.01) |
| *H04L 1/1812* | (2023.01) |

(52) U.S. Cl.
CPC ........... *H04W 72/1268* (2013.01); *H04L 1/08* (2013.01); *H04L 1/1812* (2013.01)

(58) Field of Classification Search
CPC ..... H04L 1/08; H04L 1/1812; H04W 72/1268
See application file for complete search history.

(56) References Cited

U.S. PATENT DOCUMENTS

| | | | |
|---|---|---|---|
| 2021/0376959 A1 | 12/2021 | Yang et al. | |
| 2021/0410180 A1* | 12/2021 | Tsai | ....................... H04L 1/1819 |
| 2022/0210798 A1* | 6/2022 | Tsai | ........................ H04L 5/006 |

FOREIGN PATENT DOCUMENTS

| | | |
|---|---|---|
| CN | 107332646 A | 11/2017 |
| CN | 111294868 A | 6/2020 |
| KR | 10-2020-009939 A | 1/2020 |
| KR | 10-2020-0099394 | 1/2020 |

OTHER PUBLICATIONS

Extended European Search Report for corresponding European application No. 21916711.1 dated Feb. 27, 2024, 9p.
Samsung, "Configured Grant based Small Data Transmission", 3GPP TSG-RAN2, R2-2009094, Nov. 13, 2020, 8p.
Vivo, "Supporting small data transmission via CG configuration", 3GPP TSG-RAN WG2, Meeting #112e, R2-2008961, Nov. 13, 2020, 4p.
InterDigital, "Beam selection and maintenance for CG-based SDT", 3GPP RAN WG2 Meeting #112e, R2-2010108, Nov. 13, 2020, 3p.

(Continued)

*Primary Examiner* — Kevin M Cunningham
(74) *Attorney, Agent, or Firm* — Crowell & Moring LLP

(57) ABSTRACT

A wireless communication method for use in a wireless terminal is disclosed. The method comprises performing a second uplink, UL, transmission when a listen-before-talk procedure of a first UL transmission fails and a flag is configured, wherein a first UL duration of the first UL transmission overlaps a second UL duration of the second UL transmission.

8 Claims, 5 Drawing Sheets

Determine a condition associated with using a configured UL grant for retransmitting an SDT message of an SDT is met    701

Retransmit, to the wireless network node, the SDT message by using the configured UL grant    702

(56)     References Cited

OTHER PUBLICATIONS

InterDigital, "Configuration and selection of CG-based SDT resource", 3GPP RAN WG2 Meeting #112e, R2-2010107, Nov. 13, 2020, 3p.
CATT, "Analysis on SDT Procedures using CG", 3GPP TSG-RAN WG2 Meeting #112e, R2-2009369, Nov. 13, 2020, 5p.
International Search Report (PCT/ISA/210) and Written Opinion issued in PCT Application No. PCT/CN2021/070318 dated Sep. 24, 2021 (8 pages).
Charter Communications; "Handling Uplink LPT Failures in NR-U", 3GPP TSG-RAN WG2 Meeting #106 R2-1907284, May 13-17, 2019, (3 pages).
Translation of Notice of Grant issued for the JP Patent Application No. 2023-520190 dated Feb. 4, 2025, previously cited as F1 in an Information Disclosure Statement submitted Feb. 18, 2025 (4 pages).
Office Action issued for China Patent Application No. 202311250204.6 mailed Aug. 1, 2024, with English translation (8 pages).
Notice of Grant issued for the JP Patent Application No. 2023-520190 dated Feb. 4, 2025 (4 pp.).
Written Opinion issued for the JP Patent Application No. 2023-520190 dated Dec. 18, 2024 (2 pp.).

Office Action issued for China Patent Application No. 202311250204.6 mailed May 11, 2024, with English translation (16 pages).
Office Action issued for EP Patent Application No. 21 916 711.1 dated Dec. 9, 2024 (5 pp.).
Office Action issued for Japanese Patent Application No. 2023-520190 mailed Oct. 22, 2024, with English translation (7 pages).
Nokia, Nokia Shanghai Bell, "SDT Control Plane Aspects for RACH Based Schemes,"3GPP TSG-RAN WG2 Meeting #112 Electronic, Elbonia, R2-2009919, Nov. 2-13, 2020 (7 pages).
Office Action issued for EP Patent Application No. 21 916 711.1 dated Jul. 16, 2025 (5 pp.).
European Patent Office Office Action issued in Application No. 21 916 711.1 dated Feb. 18, 2026, (5 pages).
Korean-language Office Action with English summary issued in Korean Application No. 10-2023-7010985 dated Nov. 12, 2025, (7 pages).
Korean-language Notice of Allowance issuede in Korean Application No. 10-2023-7010985 dated Apr. 28, 2026 with English translation (7 pages).
Search Report and Written Opinion issued in Singapore Patent Application No. 11202301639Y dated May 9, 2026 (9 pages).

* cited by examiner

Perform a second UL transmission when an LBT procedure of a first UL transmission fails and a flag is configured ⟋ 501

FIG. 5

Configure, to a wireless terminal, a flag associated with performing an HARQ operation for a deprioritized UL transmission when an LBT procedure of a prioritized transmission overlapping the deprioritized UL transmission fails ⟋ 601

FIG. 6

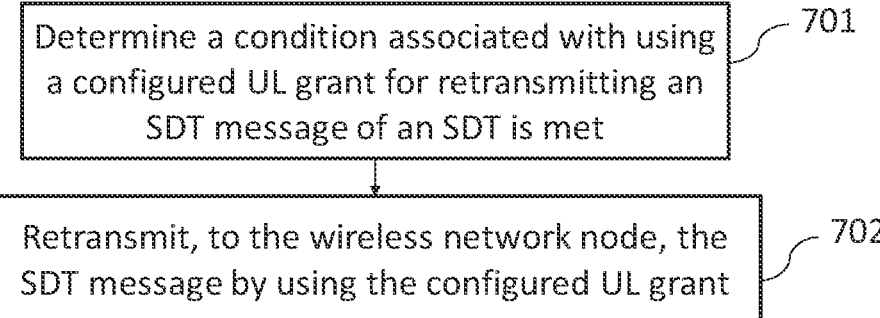

Determine a condition associated with using a configured UL grant for retransmitting an SDT message of an SDT is met ⟋ 701

Retransmit, to the wireless network node, the SDT message by using the configured UL grant ⟋ 702

FIG. 7

Configure, to a wireless terminal, a timer for retransmitting an SDT message of an SDT ⟋ 801

FIG. 8

Prioritize a first UL transmission over a second UL transmission when a boundary transmission flag associated with the first UL transmission is configured and the boundary transmission flag associated with the second UL transmission is not configured ⟋ 901

FIG. 9

When a boundary transmission flag of a UL transmission is configured, always perform a UL transmission of the UL grant ⟋ 1001

FIG. 10

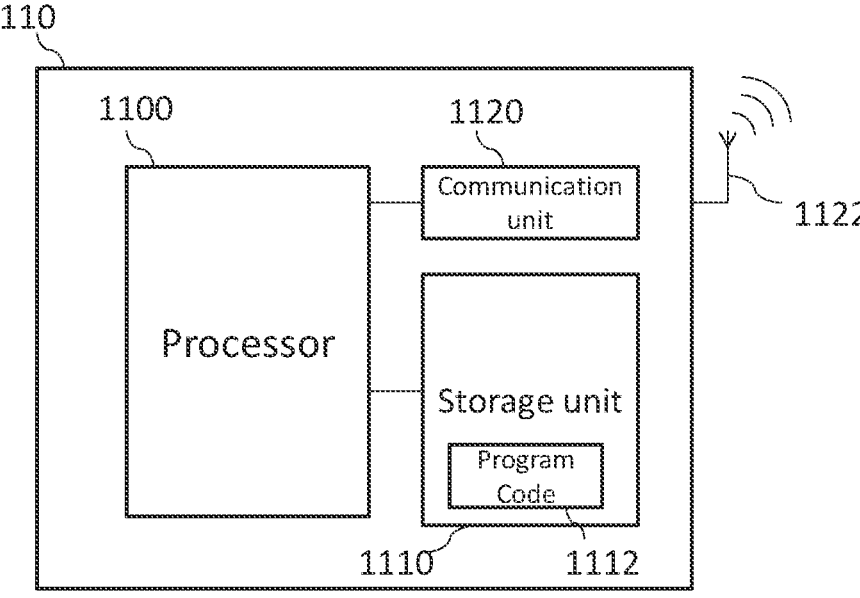

METHOD FOR UPLINK TRANSMISSION AND DEVICE THEREOF

This application is continuation of International Application PCT/CN2021/070318, filed on Jan. 5, 2021, which is incorporated by reference in its entirety.

This document is directed generally to wireless communications, in particular of 5G New Radio communications.

Due to non-ideal effects from the environment, data transmissions between terminals (e.g. user equipment (UE) and wireless network nodes) may fail or the terminal may not be able to decode the received data correctly. Under such conditions, the terminal may be required to retransmit the data associated with abnormal transmissions. The retransmission schemes are always an important topic in the wireless communications.

This document relates to methods, systems, and devices for uplink transmission, in particular to methods, systems, and devices for retransmitting the uplink transmission.

The present disclosure relates to a wireless communication method for use in a wireless terminal. The method comprises:

performing a second uplink, UL, transmission when a listen-before-talk procedure of a first UL transmission fails and a flag is configured, wherein a first UL duration of the first UL transmission overlaps a second UL duration of the second UL transmission.

Various embodiments may preferably implement the following features:

Preferably, the second UL transmission have been deprioritized by the first UL transmission for being transmitted.

Preferably, the method further comprises determining the second UL transmission from a plurality of UL transmissions, wherein each of the plurality of UL transmissions has a UL duration overlaps the first UL duration, wherein the second UL transmission is a prioritized UL transmission in the plurality of UL transmissions or the second UL transmission is randomly selected from the plurality of UL transmissions.

Preferably, each of the first UL transmission, the second UL transmission and the plurality of UL transmissions is one of a physical UL shared channel transmission for a UL grant or a scheduling request transmission.

Preferably, the flag is associated with performing a hybrid automatic repeat request, HARQ, operation for a deprioritized UL transmission when a listen-before-talk procedure of a prioritized transmission overlapping the deprioritized UL transmission fails.

Preferably, the flag is configured per cell group, per serving cell or per bandwidth part.

Preferably, the second UL transmission is performed by:

transmitting, to a hybrid automatic repeat request, HARQ, entity, a first UL grant of the first UL transmission, a second UL grant of the second UL transmission and HARQ information of the first UL grant and the second UL grant.

Preferably, the first UL grant is one of a configured UL grant and a dynamic grant and the second UL grant is another one of the configured UL grant and the dynamic grant.

Preferably, the method further comprises instructing a physical layer to perform a scheduling request transmission when the scheduling request transmission overlaps at least one of the first UL transmission or the second UL transmission.

The present disclosure relates to a wireless communication method for use in a wireless network node. The method comprises:

configuring, to a wireless terminal, a flag associated with performing a hybrid automatic repeat request, HARQ, operation for a deprioritized UL transmission when a listen-before-talk procedure of a prioritized transmission overlapping the deprioritized UL transmission fails.

Various embodiments may preferably implement the following feature:

Preferably, the flag is configured per cell group, per serving cell or per bandwidth part.

The present disclosure relates to a wireless communication method for used in a wireless terminal. The method comprises:

determining a condition associated with using a configured uplink, UL, grant for retransmitting a small data transmission, SDT, message of an SDT is met, and retransmitting, to a wireless network node, the SDT message by using the configured UL grant.

Preferably, the SDT comprises is characterized by at least one of the following features:

a packet size of 100 bytes, a latency of 5 seconds to 30 minutes or 1 hour, or a frequency of every minute and up to monthly.

Preferably, the SDT is defined according to 3GPP TR 25.705 V13.0.0.

Various embodiments may preferably implement the following features:

Preferably, the SDT message comprises at least one of:

a radio resource control message of initiating the SDT or a data message of the SDT.

Preferably, the condition associated with using the configured UL grant for transmitting the SDT message comprises at least one of:

the SDT message has been transmitted by using the configured UL grant and has not been transmitted by using a dynamic grant scheduled with an identifier of the wireless terminal, no acknowledge message corresponding to the SDT message is received before a first timer expires, a non-acknowledge message corresponding to the SDT message is received, no ACK corresponding to the SDT message is received when a time duration terminates, the first timer stops and a second timer is running, wherein the second timer starts when a hybrid automatic repeat request, HARQ, identification, ID, of transmitting the SDT message is used, or a counter does not reach the maximum number of attempt times for transmissions or retransmissions.

Preferably, the first timer is configured per configured UL grant and associated with an HARQ process ID of the corresponding configured UL grant.

Preferably, the first timer associated with an HARQ process starts when the SDT message is transmitted by using the configured UL grant associated with the HARQ process.

Preferably, the first timer associated with an HARQ process stops when the wireless terminal receives the acknowledge message or the non-acknowledge message in response to the SDT message transmission associated with the HARQ process.

Preferably, the acknowledge message (in response to the configured UL grant with a HARQ process) comprises at least one of:

downlink feedback information indicating the acknowledge message in response to the SDT message transmission, or downlink control information indicating the same HARQ process ID (i.e. ID of the HARQ process of the configured UL grant) of sending a new SDT message by using the dynamic UL grant.

Preferably, the non-acknowledge message comprises downlink feedback information indicating the non-acknowledge message in response to the SDT message transmission.

Preferably, the counter is configured per configured UL grant and/or associated with an HARQ process ID.

Preferably, the counter associated with an HARQ process is increased by 1 for at least one of:

each time of performing the SDT message transmission by using the configured UL grant with the HARQ process, each time of the first timer associated with the HARQ process expires, each time of receiving the configured UL grant of the SDT message transmission as1sociated with the HARQ process, or each time of receiving a non-acknowledge message of (e.g. in response to) the HARQ process.

Preferably, the counter associated with an HARQ process is reset when the wireless terminal performs at least one of:

receiving a radio resource control, RRC, release message of releasing to an inactive state, transmitting, to the wireless network node, an SDT message by using the configured UL grant associated with the HARQ process for the first time, receiving the acknowledge message or the non-acknowledge message corresponding to the HARQ process of the SDT message, or receiving a downlink control channel for scheduling a UL transmission associated with the HARQ process of the SDT message.

Preferably, the counter reaches the maximum number of attempt times and the method further comprises at least one of:

performing a random access channel based small data transmission, performing a random access procedure, notifying a fail reason to a radio resource control, RRC, layer, or entering an idle state.

Preferably, the retransmission of the SDT message and the first transmission of the SDT message have the same HARQ process ID.

The present disclosure relates to a wireless terminal. The wireless terminal comprises:

a communication unit, configured to perform a second uplink, UL, transmission when a listen-before-talk procedure of a first UL transmission fails and a flag is configured, wherein a first UL duration of the first UL transmission overlaps a second UL duration of the second UL transmission.

Various embodiments may preferably implement the following feature:

Preferably, the wireless terminal further comprises a processor configured to perform any of the aforementioned wireless communication methods.

The present disclosure relates to a wireless network node. The wireless network node comprises:

a communication unit, and a processor, configured to configure, to a wireless terminal via the communication unit, a flag associated with performing a hybrid automatic repeat request, HARQ, operation for a deprioritized UL transmission no earlier than a listen-before-talk procedure of a prioritized transmission overlapping the deprioritized UL transmission fails.

Various embodiments may preferably implement the following feature:

Preferably, the processor is further configured to perform any of the aforementioned wireless communication methods.

The present disclosure relates to a wireless terminal. The wireless terminal comprises:

a processor, configured to determine a condition associated with using a configured uplink, UL, grant for retransmitting a small data transmission message of an SDT is met, and a communication unit, configured to:

retransmit, to a wireless network node, the SDT message by using the configured UL grant.

Various embodiments may preferably implement the following feature:

Preferably, the processor is further configured to perform any of the aforementioned wireless communication methods.

The present disclosure relates to a computer program product comprising a computer-readable program medium code stored thereupon, the code, when executed by a processor, causing the processor to implement a wireless communication method recited in any one of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

FIG. 5 shows a flowchart of a process according to an embodiment of the present disclosure.

FIG. 6 shows a flowchart of a process according to an embodiment of the present disclosure.

FIG. 7 shows a flowchart of a process according to an embodiment of the present disclosure.

FIG. 8 shows a flowchart of a process according to an embodiment of the present disclosure.

FIG. 9 shows a flowchart of a process according to an embodiment of the present disclosure.

FIG. 10 shows a flowchart of a process according to an embodiment of the present disclosure.

FIG. 11 shows an example of a schematic diagram of a wireless terminal according to an embodiment of the present disclosure.

Embodiment 1

Figure 1:
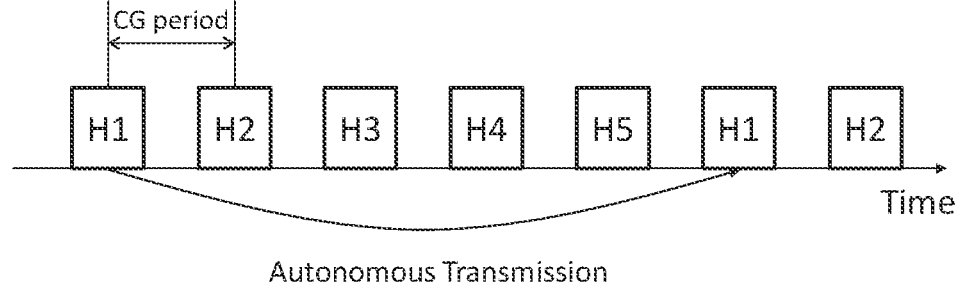
FIG. 1 shows a schematic diagram of an autonomous transmission according to an embodiment of the present disclosure.

In new radio industrial internet of thing (NRI-IoT), an autonomous transmission is introduced for a deprioritized grant in order to avoid losing media access control (MAC) packet data units (PDUs). Currently, the autonomous transmission may only use the same configured grant (CG) configuration and a CG occasion with the same hybrid automatic repeat request (HARQ) process identification (ID) of which the previous configured grant is deprioritized. Because the HARQ process ID is occurred sequentially for the contiguous CG occasions from one configured grant. The autonomous transmission of the MAC DUS may be delayed. FIG. 1 shows a schematic diagram of an autonomous transmission according to an embodiment of the present disclosure. In FIG. 8, MAC PDUs with 5 different HARQ IDs H1-H5 are transmitted respectively in 5 contiguous CG occasions, wherein a period between every two contiguous CG occasions is called CG period. Because the autonomous transmission uses the CG occasion with the same HARQ ID, a user equipment (UE) performs the autonomous transmission in a latency of 5 CG periods as shown in FIG. 1. Such long latency of the autonomous transmission may cause a delay issue.

In an embodiment, the configured grant transmission may a transmission type wherein the associated resources for transmission is pre-configured by the NW. In an embodiment, the dynamic grant transmission may a transmission type wherein the associated resources for transmission is indicated by the down link control indication from the NW.

In the present procedure, the configured grant may be equal to configured UL grant.

In an embodiment, in order to mitigate the latency of the autonomous transmission for ultra-reliable low-latency communication (URLLC) transmission, the autonomous transmission may use the configured grant with an HARQ process ID which is different from that of the configured grant used in the previous transmission.

In an embodiment, the autonomous transmission or retransmission performed via using the configured grant with different HARQ process ID may be performed when at least one of the following events occurs:

(1) The previous configured grant transmission for a HARQ process ID fails. The failure case includes at least one of the following cases:
the configured grant is deprioritized and the MAC PDU for this configured grant has been generated and is not retransmitted with CS-RNTI of the UE;

LBT failure;
non-acknowledge message (NACK) is received
a timer (e.g. cg-RetransmissiontTimer) expires and no acknowledge message (ACK) is received.
a timer (e.g. cg-RetransmissiontTimer) expires and another timer (e.g ConfiguredGrantTimer) is still running.

(2) The CG-UCI (CG UL control information) is not configured for this configured grant. For example:
the CG-UCI may be indicated by one enable flag X which can be configured as an information element in one configured grant configuration or in one serving cell where the configured grant is configured. The CG-UCI may include the at least one of the following contents: (1) The HARQ process ID for the corresponding PUSCH transmission (2) the new data indication.

(3) The size of MAC PDU for the failed configured grant matches or is less than the size of an upcoming configured grant.

In an embodiment, the HARQ operations may need changes when the autonomous transmission or retransmission uses the configured grant having different HARQ process ID:

Option 1: Derive the MAC PDU for the HARQ buffer of the autonomous transmission or retransmission from the HARQ buffer of the failed configured grant transmission. If there is still scope in the new configured grant, derive the data from multiplexing and assembly entity.

Option 2: Indicate the multiplexing and assembly entity to include the MAC PDU of the previous failed configured grant for the subsequent UL transmission, and obtain the MAC PDU for the new configured grant from the multiplexing and assembly entity.

In an embodiment, when two or more UL transmissions overlap with each other in the resource, one UL grant for one of these UL transmissions shall be prioritized by using a certain rule (i.e. logic channel (LCH) priority based rule), and other UL grants of the remaining UL transmissions shall be deprioritized. The process of prioritizing and/or deprioritizing the UL grant(s) may be called LCH based prioritization. The prioritized UL grant would be processed in HARQ operations.

According to above, at least one the following embodiments 1-1 to 1-3 may be used in the UE.

Embodiment 1-1

Step 1: One configured grant is received, go to step 2

Step 2: Determine whether there is a previous configured grant is deprioritized, whether the corresponding MAC PDU is generated and is not transmitted by using the UL grant addressed with the CS-RNTI, whether the size of generated MAC PDU matches or is less than the size of the received configured grant and whether the flag X is not configured for the deprioritized configured grant, if yes, go to step 3a or step 3b; otherwise, go to step 4.

Step 3a: Derive the MAC PDU from the HARQ buffer of the previous deprioritized configured grant (i.e. the above Option 1) and if there is no (surplus or remaining) scope for the configured grant, go to step 5; otherwise, go to step 4.

Step 3b: Indicate the multiplexing and assembly entity to include the MAC PDU of the previous failed configured grant for the subsequent UL transmission, and obtain the MAC PDU for the received configured grant again from the multiplexing and assembly entity (i.e.

the above option 2), and if there is no (surplus or remaining)scope for the configured grant go to step 5; otherwise, go to step 4.

Step 4: Derive the data from the multiplexing and assembly entity based on a link control protocol (LCP) procedure. Go to Step 5.

Step 5: Instruct the HARQ process of the received configured grant to generate a new transmission.

Embodiment 1-2

Step 1: One configure grant is received, and go to Step 2.

Step 2: Determine whether a listen before talk (LBT) procedure of the previous configured grant fails, whether the corresponding MAC PDU is transmitted by using the UL grant addressed with the CS-RNTI, whether the size of generated MAC PDU matches or less than the size of the received configured grant and whether the flag X is configured for the configured grant whose LBT procedure fails. If yes, go to step 3a or 3b; otherwise go to step 4.

Step 3a: Derive the MAC PDU from the HARQ buffer of the previous deprioritized configured grant (i.e. the above option 1), and if there is no (surplus or remaining) scope for the configured grant go to step 5; otherwise, go to step 4.

Step 3b: Indicate the multiplexing and assembly entity to include the MAC PDU of the previous failed configured grant for the subsequent UL transmission, and obtain the MAC PDU for the received configured grant again from the multiplexing and assembly entity (i.e. the above option 2) and if there is no (surplus or remaining) scope for the configured grant, go to step 5; otherwise, go to step 4.

Step 4: Derive the MAC PDU from the multiplexing and assembly entity based on the LCP procedure. Go to step 5.

Step 5: Instruct the HARQ process of the received configured grant to generate a new transmission.

Embodiment 1-3

Step 1: One configure grant is received and go to step 2.

Step 2: Determine whether a NACK is received for a HARQ process of a previous configured grant or whether no ACK/NACK is received for a HARQ process of a previous configured grant before a timer expires; whether the corresponding MAC PDU have not been transmitted by using the UL grant addressed with the CS-RNTI; and whether the size of the MAC PDU for the failed configured grant is less than or equal to the size of the received configured grant. If yes, go to Step 3a or 3b; otherwise, go to step 4.

Step 3a: Derive the MAC PDU from the HARQ buffer of the previous deprioritized configured grant (i.e. the above option 1), and if there is no (surplus or remaining) scope for the configured grant go to step 5, otherwise, go to step 4.

Step 3b: Indicate the multiplexing and assembly entity to include the MAC PDU of the previous failed configured grant for the subsequent UL transmission, and obtain the MAC PDU for the received configured grant again from the multiplexing and assembly entity. (i.e. the above option 2), and if there is no (surplus or remaining) scope for the configured grant go to step 5, otherwise, go to step 4.

Step 4: Derive the MAC PDU from multiplexing and assembly entity based on the LCP procedure. Go to step 5.

Step 5: Instruct the HARQ process of the received configured grant to generate a new transmission.

Embodiment 2

Figure 2:
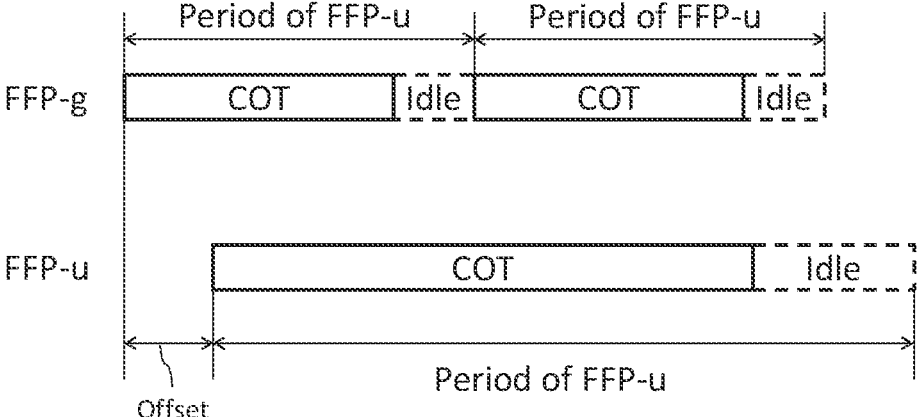
FIG. 2 shows a schematic diagram of fixed frame periods according to an embodiment of the present disclosure.

In the case that the URLLC transmission on shared spectrum channel, for a semi-persistent channel access procedure, a fixed frame period (FFP) is configured to the network (NW) and maybe configured to the UE, wherein the FFP is composed with a channel occupation time (COT) period and an idle period. The COT period may be initiated by either the UE or the NW (e.g. gNB), and the COT initiated by the NW can share to the UE and vice versa. FIG. 2 shows a schematic diagram of the FFPs according to an embodiment of the present disclosure. In FIG. 2, the FFP-g is the FFP of the gNB and the FFP-u is the FFP of the UE. Each of FFP-g and FFP-g consists of the COT period and the idle period. The durations of FFP-u and the FFP-g are different. In addition, there is an offset between starting points of the FFP-g and corresponding FFP-u.

In an embodiment, the UL grant processing for the URLLC transmission on the shared spectrum channel is updated as the following process:

A UL grant is received from downlink control information (DCI) or radio resource control (RRC) layer (i.e. configured grant)=> a Priority handling procedure=> generating corresponding MAC PDU and transfer the generated MAC PDU to the HARQ buffer of the corresponding HARQ process ID of the prioritized UL grant=> Instructing the lower layer (i.e. physical (PHY) layer) to perform transmission of the MAC PDU=> a listen before talk (LBT) procedure is performed in the PHY layer.

In an embodiment, the priority handling procedure is to determine which UL transmission is prioritized if the resources more than one UL transmission is collided with each other.

In an embodiment, the LBT procedure is used to assess the state of the channel (i.e. whether is idle or busy) before the real transmission is performed. The LBT procedure can be a kind of channel access procedure.

For a physical UL shared channel (PUSCH) transmission on the shared spectrum channel, the UE has to terminate the priority handling procedure for determining the prioritized grant for the PUSCH transmission before performing the LBT procedure. However, for the case that UE initiated COT, the UL transmission at the boundary of the FFP associated with the UE is so important since the associated LBT result will determine whether the upcoming FFP can be occupied or not. Regarding the LBT procedure and the priory handling procedure can be handled by the PHY layer and media access control (MAC) layer respectively. In order to avoid that the UE missing the upcoming COT because of the priority handling procedure, the priority handling procedure may need to be improved.

In an embodiment, the important UL transmission refers to the UL transmission which starts at the boundary of each FFP period associated with the UE in the frame-based equipment (FBE) case. The important UL transmission may be identified by at least one of the following options:

Option 1: One information element CG-BoundaryTransmission is configured in one configured grant configuration to indicate that the UL transmission for this configured grant configuration is important UL transmission.

Option 2: One information element BoundaryTransmissionIndicator is indicated in a downlink control information (DCI) to indicate the corresponding UL transmission is an important UL transmission.

Option 3: The PUCCH resources for SR transmission.

In an embodiment, for the important UL transmission, at least one of the following principles may be applied:

the important UL transmission cannot be deprioritized by the UL transmission other than the important transmission.

the important UL transmission cannot be skipped.

The following embodiments 2-1 and 2-2 may be used in the UE.

Embodiments 2-1

Step 0: In the case that the MAC entity is configured with the LCH based prioritization, one UL grant is received.

Step 0a: Determine whether this UL grant is from the higher layer (i.e. configured grant) or the lower layer (i.e. dynamic grant from PHY layer). If the UL grant is the configured grant, go to step 1a; if the UL grant is the dynamic grant, go to step 1b.

Step 1a: Determine whether this configured grant is configured with the information element CG-BoundaryTransmission. If yes, go to step 2; otherwise, go to step 3.

Step 1b: Determine whether the dynamic grant is a boundary transmission according to the received DCI (e.g. the information element BoundaryTransmissionIndicator). If yes, go to step 2; otherwise, go to step 3.

Step 2: Determine whether there is overlapping PUSCH duration of another configured grant which is configured with the information element CG-BoundaryTransmission and whose priority is higher than the received UL grant; and whether there is overlapping PUSCH duration of another dynamic grant which is indicated from the DCI as a boundary transmission whose priority is higher than the received UL grant, and whether there is a scheduling request (SR) transmission which is at boundary of the UE initiated COT whose priority is higher than the received UL grant; if yes, go to step 5, otherwise, go to step 4.

Step 3: Determine whether there is overlapping PUSCH duration of a configured grant which is configured with the information element CG-BoundaryTransmission; whether there is overlapping PUSCH duration of a dynamic grant which is indicated from the DCI as a boundary transmission, and whether there is overlapping PUSCH duration of another configured grant whose priority is higher than the received UL grant, and whether there is no other overlapping PUSCH duration of a dynamic grant whose priority is higher than the received UL grant, and whether there is SR transmission which is at the boundary of the UE initiated COT whose priority is higher than the received UL grant. If yes, go to step 5; otherwise, go to step 4.

Step 4: Consider the received UL grant as prioritized UL grant, and consider other overlapping UL grant, if any, as deprioritized UL grant, Consider other overlapping SR transmission, if any, as deprioritized SR transmission.

Step 5: Consider the received UL grant as deprioritized UL grant.

Embodiment 2-2

Step 1: Determine whether a UL grant is one dynamic grant corresponding to a boundary transmission according to the received DCI or whether the UL grant is one configure grant corresponding to a boundary transmission according to the IE CG-BoundaryTransmission, If yes, go to step 2; otherwise, the process ends.

Step 2: This UL grant for boundary transmission cannot be skipped at any time.

Embodiment 3

Figure 3:
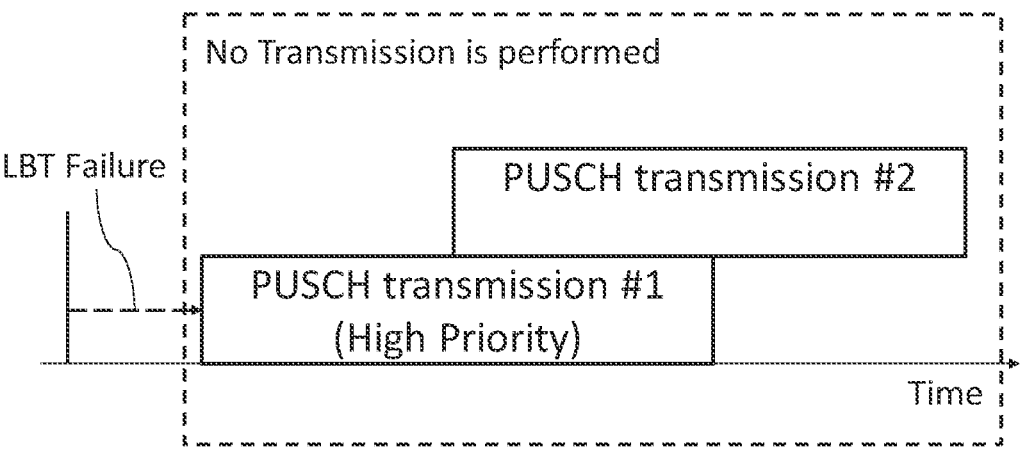
FIG. 3 shows a schematic diagram of the collision according to an embodiment of the present disclosure.

In an embodiment, a collision may occur among multiple UL grants without involving important transmissions. Under such a condition, if the LBT procedure for the prioritized UL grant (i.e. prioritized UL transmission) fails, the UL transmission for the prioritized UL grant cannot be performed. Furthermore, other UL transmissions for the deprioritized UL grant also cannot be performed. FIG. 3 shows a schematic diagram of the collision according to an embodiment of the present disclosure. In FIG. 3, a PUSCH transmission #1 has a higher priority than a PUSCH transmission #2. In this embodiment, the PUSCH transmission #1 suffers an LBT failure (i.e. the corresponding LBT procedure fails). As a result, no transmission can be performed and resources are wasted.

In an embodiment, a MAC based method is proposed to avoid the resources waste due to the LBT procedure failure. In this embodiment, the UE may support a function of making a MAC entity to process other deprioritized UL grant when the LBT procedure of the prioritized UL grant fails.

In an embodiment, a feature flag is introduced for indicating whether the function of reprocessing the deprioritized UL grant when the LBT procedure of the prioritized UL grant fails. For example, the NW may configure this feature flag (e.g. set the feature flag to "1") to the UE, to instruct the UE to open the function of reprocessing the deprioritized UL grant when the LBT procedure of the prioritized UL grant fails. This feature flag may be named PriorityHandlingOnSharedSpectrumChannel. In an embodiment, the feature flag may be defined in a granularity of:

per cell group per serving cell or bandwidth part (BWP)

For realizing the MAC based method, the UE may perform the processes in the following embodiment 3-1 and/or 3-2.

Embodiment 3-1

Step 1: Determine whether an LBT failure indication for a prioritized UL grant is received from a lower layer (i.e. physical layer), whether there is overlapping PUSCH duration(s) for deprioritized UL grant(s) in the same BWP and whether the feature flag is configured. If yes, go to step 2; otherwise, go to step 3.

Step 2: Determine another prioritized UL grant among the deprioritized UL grant(s) whose PUSCH duration overlaps that of the prioritized UL grant corresponding to the LBT failure indication, and process HARQ operation(s) for the determined prioritized UL grant.

For step 2, in an embodiment, the prioritization of the MAC PDU or the UL grant can be determined based on the priority level of the LCH from which the data composing the MAC PDU for this UL grant (i.e. LCH-based prioritization).

Embodiment 3-2

Step 1: Determine whether an LBT failure indication for a prioritized UL grant is received from the lower layer, whether there is other overlapping PUSCH duration for deprioritized UL grant(s) in the same BWP and the feature flag is configured. If yes, go to step 2; otherwise, go to step 3.

Step 2: Determine an available UL grant randomly from the deprioritized UL grant(s) whose PUSCH duration overlaps that of the prioritized UL grant for performing HARQ operation.

In an embodiment, a PHY based method is proposed to avoid the resources waste due to the LBT procedure failure. In this embodiment, when receiving a couple of UL grants those may conflict with each other, the MAC entity generates MAC PDUs for all the conflicted UL grants and send the MAC PDUs and the UL grants to the PHY layer. The PHY layer implements the transmission by considering that the LBT procedure result and priority class of each MAC PDU in combination.

In an embodiment, a feature flag (e.g. flag PriorityHandlingOnSharedSpectrumChannel) associated with generating the MAC PDUs of all received UL grants those may conflict with each other is introduced. This feature flag may be defined in a granularity of:

Per cell group

Per serving cell or BWP

In an embodiment , when this feature flag is set (e.g. to bit "1"), the UE generates all the MAC PDUs for each UL grant and/or a scheduling request (SR) transmission if two or more (i.e. more than one) UL transmissions from UL grants and/or the SR transmission are collided with each other and sends the MAC PDUs and the corresponding UL grant or instruct the SR transmission to the lower layer (i.e. PHY layer). More specifically, when the feature flag is configured (e.g. set), the UE may adopt at least one of:

In the case that a configured UL grant is collided with a dynamic UL grant (e.g. the PUSCH duration of the configured UL grant overlaps the PUSCH duration of the dynamic UL grant), the UE delivers the HARQ information and UL grant for both configured UL grant and dynamic UL grant to the HARQ entity, in the case that the PUSCH transmission of a UL grant is collided with the SR transmission, the UE delivers the HARQ information and UL grant to the HARQ entity for the UL grant, and UE instructs the lower layer to generate the SR transmission, or in the case that the LCH-based prioritization is configured, the UE may treat each received UL grant as a prioritized UL grant. As an alternative or in addition, the UE may send the LCH based priority level for each uplink grant to the lower layer.

In case that more than one MAC PDUs are sent to the lower layer, in order to make the UE perform autonomous (re)transmission, the MAC entity shall figure out which MAC PDU(s) has (have) been transmitted and which MAC PDU(s) has (have) not been.

In an embodiment, when the MAC entity generates the MAC PDUs for all UL grants those are collided with each other and send them to the lower layer, the lower layer may send result(s) of the transmission(s) of these MAC PDUs to the MAC entity in order to maintain the autonomous (re) transmission performance.

For example, when the PHY layer receives multiple MAC PDUs from the upper layer (i.e. MAC layer) for a couple of UL grants whose PUSCH durations overlap with each other, the PHY layer determines which MAC PDU is transmitted based on the priority class of each UL grant. For other MAC PDUs which are not transmitted, the PHY layer notifies the upper layer about the result of the MAC PDU transmission.

According to the transmission result from the PHY layer, the MAC entity is able to perform the autonomous (re) transmission for the non-transmitted MAC PDU(s) which is (are) associated with a configured grant and the configured grant is configured with an autonomous transmission flag.

The following embodiments 3-3 and 3-4 are used in the UE.

Embodiment 3-3

Step 0: One or more UL grants are received from a lower layer (i.e. dynamic grant from the PHY layer) or a higher layer (i.e. configured grant from the RRC layer), go to step 1.

Step 1: Determine whether the UE is configured with a flag PriorityHandlingOnSharedSpectrumChannel for one serving cell where the UL grant is received. If yes, go to step 2; otherwise go to step 5.

Step 2: Determine whether the UE is configured with the LCH-based prioritization. If yes, go to step 3; otherwise, go to step 4.

Step 3: Each received UL grant (i.e. including both configured UL grant and dynamic grant) on this serving cell is considered as prioritized grant. Go to step 4.

Step 4: Transfer the HARQ information and UL grant to the HARQ entity for each received UL grant no matter the associated PUSCH duration for the UL grant overlaps other UL transmissions or not.

Step 5: Transfer the HARQ information and UL grant to the HARQ entity for the configured grant if the associated PUSCH duration does not overlap the PUSCH duration of a dynamic grant which is addressed with TC-RNTI (temporary cell RNTI), C-RNTI (cell RNTI), CS-RNTI (configured scheduling RNTI) or from RAR (random access response).

Embodiment 3-4

Step 0: Determine a scheduling request (SR) triggered and there are PUCCH resources that are configured for this SR, go to step 1.

Step 1: Determine whether the PUCCH duration overlaps with the PUSCH duration of a UL grant. If yes, go to step 2; otherwise, go to step 6

Step 2: Determine whether the UE is configured with PriorityHandlingOnSharedSpectrumChannel for one serving cell where the PUCCH resources are configured. If yes, go to step 3; otherwise go to step 5.

Step 3: Determine whether the UE is configured with the LCH-based prioritization. If yes, go to step 4; otherwise go to step 5.

Step 4: Consider the SR as a prioritized SR, consider other UL grant(s), if any, as prioritized UL grant. Go to step 5.

Step 5: Instruct the lower layer to generate SR transmission.

Step 6: End.

Embodiment 4

The UE in an inactive state (e.g. RRC inactive state) may perform CG based small data transmission (SDT) for sending the data directly to the NW without initiating a random access procedure. The SDT is able to save UE power and decrease interferences on a physical random access channel (PRACH).

In the present disclosure, the SDT may be a data transmission performed for (or by) the UE in an inactive state (e.g. RRC inactive state (RRC_INACTIVE)) or a connection management (CM) connected (CM-CONNECTED) state. The SDT may be performed in a random access procedure or a(n) (RRC) resume procedure. In an embodiment, fundamental characteristics of the SDT may comprise at least one of:

a(n) (application) packet size of 100 bytes for uplink (UL) and 100 bytes for downlink (DL);

latency of 5 seconds to 30 minutes; 1 hour for no mobility scenario;

frequency of every minute and up to monthly.

Note that, the latency of the SDT is a duration from the packet of the SDT arriving at the buffer until the packet is completely transmitted. According to an embodiment, the SDT is further specified in 3GPP TR 25.705 V13.0.0.

Figure 4:
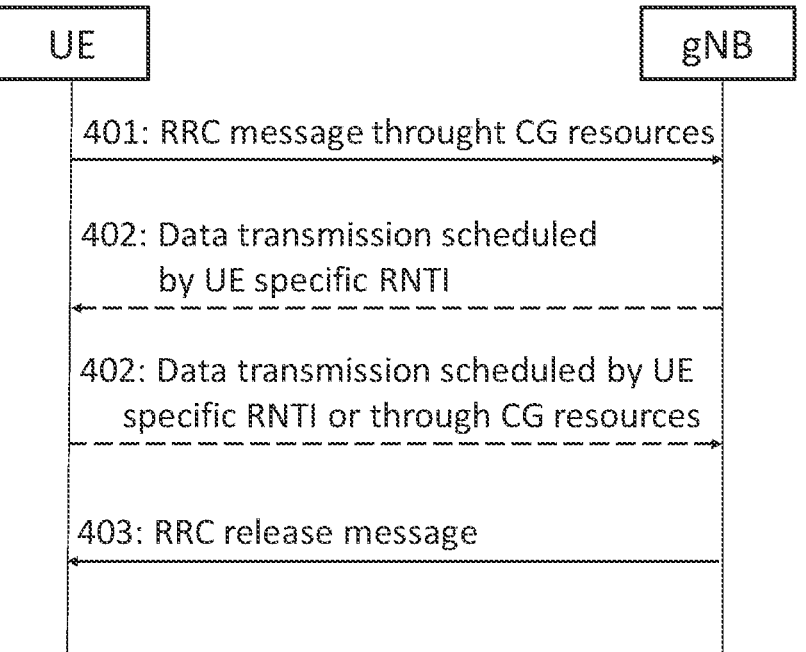
FIG. 4 shows a schematic diagram of a configured grant based small data transmission according to an embodiment of the present disclosure.

FIG. 4 shows a schematic diagram of a CG-based SDT according to an embodiment of the present disclosure. In FIG. 4, when determining to initiate the CG-based SDT, the UE transmits an RRC message through CG resources. In addition to the RRC message, the UE may also transmit a buffer size report (BSR) and/or dedicated radio bearer (DRB) data packet along with the RRC message (step 401).

In step 402, once initial CG transmission is performed, the UE should monitor UE specific-RNTI (radio network temporary identifier) for (subsequent) data transmission and retransmission. The DL transmission will be made based on a dynamic scheduling addressed to the UE specific RNTI and the UL transmission can be made by either a dynamic grant addressed to the UE specific RNTI or a configured grant.

In step 403, the UE receives an RRC release message and stop the monitor of the UE specific RNTI and enters the normal inactive state.

An issue may happen during the SDT transmission by using the configured grant. More specifically, for the CG based SDT, the NW (e.g. gNB) has no idea when the SDT will be triggered and performed by the UE. If the UL CG based SDT is missed by the NW, no retransmission will be scheduled.

In an embodiment, the SDT comprises at least one of:

transmitting the RRC message for initiating the small data transmission by using the configured grant.

transmitting data (message) other than the RRC message by using the configured grant.

In step 401 of the above CG based SDT procedure, the UE may have no idea about the next step in the case that the RRC message for initiating the CG based SDT is not successfully transmitted (i.e. the NW cannot receive the RRC message, and then cannot give the ACK/NACK message). How to determine to re-transmit the CG based SDT with the configured grant may be an issue required to be discussed.

Furthermore, in step 402 of the above CG based SDT transmission, the UE may have no idea whether the data of the CG based SDT is successfully transmitted or not. How to determine to re-transmit the CG based SDT transmission with a configured grant may also be an issue required to be discussed.

In an embodiment, the re-transmission of the small data (i.e. the data (message) of the SDT) with the configured grant can be triggered by at least one of the following events:

the data message (i.e. the message comprising the data of SDT) has been transmitted by using the configured grant and has not been transmitted by using a dynamic grant scheduled with UE specific RNTI.

No ACK corresponding to the CG based SDT transmission is received before a new timer expires.

NACK corresponding to the CG based SDT transmission is received.

No ACK corresponding to the CG based SDT transmission is received when a time duration terminates.

a newly introduced timer is not running and timer ConfiguredGrantTimer is still running.

a counter does not reach the maximum number value (e.g. the maximum number of attempt times for retransmission).

In an embodiment comprising the new timer in above events, this timer may be named sdt-intiationRetransmissionTimer and can be configured per configured grant configuration and/or associated with an HARQ process ID. This timer comprises the following features:

START/Restart: Each transmission of an SDT message (e.g. RRC message or data message of the SDT) with the configured grant is performed.

STOP: The ACK/NACK for the SDT is received.

In an embodiment, the UE determines that the ACK is received when receiving (e.g. from the NW) at least one of:

downlink feedback information indicating the ACK

DCI, indicating the same HARQ process ID which is used for sending the SDT message by using the configured grant.

In an embodiment, the UE determines that the NACK is received based on at least one of the following events:

receiving downlink feedback information indicating the NACK, no DCI indicating the same HARQ process ID is received, wherein the HARQ process ID is used for sending the SDT message with configured grant.

In an embodiment, the timer ConfiguredGrantTimer may be reused to determine whether the transmission of the RRC message for initiating the CG based SDT fails. In an embodiment, the timer ConfiguredGrantTimer starts/restarts when the related HARQ process ID is used for performing the UL transmission.

In an embodiment of performing the re-transmission with the configured grant, the configured grant used for the retransmission may have the same HARQ process ID and/or the same configured grant configuration which are used for the failed SDT message transmission. In another embodiment, the UE attaches the configured grant for the retransmission with the same HARQ process ID which are used for the failed SDT message transmission.

In an embodiment, the re-transmission by using the configure grant may endlessly fail. In order to save power and resources, a counter and an information element for indicating the maximum number of attempt times (e.g. MAXIMUM NUMBER) may be introduced.

In an embodiment, behaviors of the counter may be defined as below:

Reset/Set:

the counter is reset when the UE receives the RRC release message for changing the UE status from the CG based SDT to the normal inactive state.

the counter is reset when UE transmits the SDT message with the configured grant associated with a HARQ process ID for the first time.

the counter is reset when a NACK/ACK (corresponding to the SDT message) is received.

Increment:

the counter increase by 1 (i.e. counter=counter+1) for each time of the SDT message transmission with the configured grant. In an embodiment, the counter increase by 1 when the timer sdt-intiationRetransmis-
sionTimer expires and/or when the configured grant
used for retransmission is received, and/or when the
configured grant used for retransmission is performed.

When the counter reaches the maximum number of
attempt times (i.e. COUNTER=MAXIMUM NUMBER or
COUNTER=MAXIMUM NUMBER+1):

the UE may fall back to a RACH based SDT transmission.

the UE may initiate a random access procedure.

the UE may notify the fail reason to the upper layer (e.g.
RRC layer).

the UE may get into an idle state (e.g. RRC IDLE).

In an embodiment, this counter may be configured per
configured grant configuration or per serving cell or per
bandwidth part. In an embodiment, one counter may be
associated with single HARQ process ID.

Based on the above, processes in the following embodi-
ments which may be performed by the UE are illustrated as
examples.

Embodiment 4-1

Step 1: Transmit or Re-transmit the RRC message for
initiating the CG based SDT by using the configured
grant, go to step 2.

Step 2: Determine whether the corresponding ACK/
NACK is received or not, if yes go to step 6, if not, go
to step 3.

STEP 3: Increase the counter by 1, go to step 4.

Step 4: Determine whether the counter reaches the maxi-
mum number of attempts times. If yes, go to Step 5;
otherwise, go to step 1 when a new configured grant is
received for retransmitting the data message.

Step 5: UE fall back to RACH based SDT transmission,
go to step 6.

Step 6: Reset the counter.

Embodiment 4-2

Step 1: Receive one configured grant from the higher
layer when the UE is in inactive state.

Step 2: Determine whether the timer sdt-intiationRetrans-
missionTimer corresponding to a MAC PDU expires,
whether the received configured grant have the same
HARQ process ID with the initial transmission of the
MAC PDU and whether the MAC PDU has been
transmitted by using the UL grant addressed with the
UE specific RNTI or the UE specific Search Space or
the UE specific CORESET. If yes, go to step 3;
otherwise, go to step 5.

Step 3: Consider the MAC PDU has been derived and
perform the HARQ process to generate the transmis-
sion of the MAC PDU. Go to step 4.

Step 4: reset and start the timer (e.g. timer sdt-intiation-
RetransmissionTimer).

Step 5: End.

FIG. 5 shows a flowchart of a process according to an
embodiment of the present disclosure. FIG. 5 may be used
in a wireless terminal (e.g. UE) and comprises the following
step:

Step 501: Perform a second UL transmission when an
LBT procedure of a first UL transmission fails and a
flag is configured.

In this embodiment, when an LBT procedure of a first UL
transmission fails and a flag is configured, the wireless
terminal performs a second UL transmission. Note that, a first UL duration of the first UL transmission overlaps a
second UL duration of the second UL transmission.

In an embodiment, (a first UL grant of) the first UL
transmission is prioritized over (a second UL grant of) the
second UL transmission (e.g. LCH based prioritization). In
other words, the second UL transmission/grant is depriori-
tized by the first UL transmission/grant, e.g. for being
transmitted.

In an embodiment, a plurality of UL transmissions over-
laps with the first UL transmission. In this embodiment, the
second UL transmission is determined (e.g. selected) from
the plurality of UL transmissions. For example, the second
UL transmission may be randomly selected from the plu-
rality of UL transmissions. As an alternative, the second UL
transmission is a prioritized UL transmission in the plurality
of UL transmissions (e.g. the second UL transmission has
the highest priority level in the plurality of UL transmis-
sions).

In an embodiment, each of the first UL transmission, the
second UL transmission and the plurality of UL transmis-
sions is one of a physical UL shared channel transmission
for a UL grant or a scheduling request transmission.

In an embodiment, the flag is associated with performing
an HARQ operation for a deprioritized UL transmission (e.g.
the second UL transmission) no earlier than (i.e. when or
after) an LBT procedure of a prioritized transmission (e.g.
the first UL transmission) overlapping the deprioritized UL
transmission fails.

In an embodiment, the flag is configured per cell group,
per serving cell or per bandwidth part.

In an embodiment, the wireless terminal performs the
second UL transmission when the LBT procedure of the first
UL transmission fails and the flag is configured by:

transmitting, to an HARQ entity, a first UL grant of the
first UL transmission, a second UL grant of the second
UL transmission and HARQ information of the first UL
grant and the second UL grant. Note that, the first UL
grant is one of a configured grant and a dynamic grant
and the second UL grant is another one of the config-
ured grant and the dynamic grant.

In an embodiment, the wireless terminal may instruct a
physical layer to perform an SR transmission when the SR
transmission overlaps at least one of the first UL transmis-
sion or the second UL transmission.

FIG. 6 shows a flowchart of a process according to an
embodiment of the present disclosure. The process may be
used in a wireless network node (e.g. NW or gNB) and
comprises the following step:

Step 601: Configure, to a wireless terminal, a flag asso-
ciated with performing an HARQ operation for a
deprioritized UL transmission when an LBT procedure
of a prioritized transmission overlapping the depriori-
tized UL transmission fails.

In FIG. 6, the wireless network node may configure a flag
to a wireless terminal (e.g. UE), to enabling the wireless
terminal to perform an HARQ operation for a deprioritized
UL transmission when an LBT procedure of a prioritized
transmission fails. The deprioritized UL transmission over-
laps the prioritized UL transmission.

In an embodiment, the flag is configured per cell group,
per serving cell or per bandwidth part.

FIG. 7 shows a flowchart of a process according to an
embodiment of the present disclosure. FIG. 7 may be used
in a wireless terminal (e.g. UE) and comprises the following
steps:

Step 701: Determine a condition associated with using a configured UL grant for retransmitting an SDT message of an SDT is met.

Step 702: Retransmit, to the wireless network node, the SDT message by using the configured UL grant.

In FIG. 7, the wireless terminal firstly transmits an SDT message of an SDT (e.g. CG-based SDT) by using a configured UL grant. When or after (determining) a condition associated with using the configured UL grant for retransmitting the SDT message of the SDT is met (e.g. the transmission of the SDT message fails), the wireless terminal retransmits the SDT message by using the (same) configured UL grant. For example, the configured grant of the retransmission and the first transmission of the SDT message may have the same HARQ process ID.

In an embodiment, the SDT message may comprise at least one of:

an RRC message of initiating the SDT, or a data message of the SDT (i.e. the message comprising the data of the SDT).

In an embodiment, the condition of using the configured grant for transmitting the SDT message comprises at least one of:

the SDT message is transmitted by using the configured grant and is not transmitted by using a dynamic grant scheduled with an identifier of the wireless terminal (e.g. UE specific RNTI), no ACK corresponding to (e.g. in response to) the SDT message is received before a first timer (e.g. New timer sdt-intiationRetransmissionTimer) expires, a NACK message corresponding to the SDT message is received, no ACK corresponding to the SDT message is received when a time duration terminates, the first timer stops and a second timer (e.g. timer ConfiguredGrantTimer) is running, a counter does not reach the maximum number of attempt times for transmissions.

In an embodiment, the second timer starts when an HARQ process ID of transmitting the SDT message is used. In an embodiment, the second timer may be the timer ConfiguredGrantTimer.

In an embodiment comprising the first timer in above conditions, the first timer may be configured per configured grant configuration and associated with an HARQ process. Note that, the HARQ process has a corresponding HARQ process ID. That is, the first timer is associated with the HARQ process ID corresponding to the associated HARQ process.

In an embodiment, the first timer associated with the HARQ process starts when the SDT message is transmitted by using a configured grant with the (same) HARQ process (or the same HARQ process ID).

In an embodiment, the first timer associated with the HARQ process stops when the wireless terminal receives the NACK/ACK in response to the SDT message associated with the (same) HARQ process (or the same HARQ process ID).

In an embodiment, the ACK to an HARQ process comprises at least one of:

downlink feedback information indicating the ACK, or

DCI indicating the same HARQ process ID of sending the SDT message by using the configured grant.

In an embodiment, the NACK comprises downlink feedback information indicating the NACK.

In an embodiment, the counter is configured per configured UL grant and/or associated with an HARQ process ID.

In an embodiment, the counter associated with an HARQ process is increased by 1 for at least one of:

each time of (the wireless terminal) performing the SDT message transmission by using the configured UL grant associated with the (same) HARQ process, each time of the first timer associated with the (same) HARQ process expires, each time of (the wireless terminal) receiving the configured UL grant associated with the (same) HARQ process of the SDT message transmission, or each time of receiving the NACK of (e.g. in response to) the HARQ process.

In an embodiment, the counter may be associated with an HARQ process is reset when the wireless terminal performs at least one of:

receiving an RRC release message of releasing to an inactive state, transmitting, to the wireless network node, an SDT message by using the configured UL grant associated with the (same) HARQ process for the first time (i.e. the first transmission of SDT message), receiving the acknowledge message or the non-acknowledge message corresponding to the SDT message associated with the (same) HARQ process, or receiving a downlink control channel for scheduling a UL transmission associated with the (same) HARQ process of the SDT message.

In an embodiment, the counter reaches the maximum number of attempt times. The wireless terminal may perform at least one of:

performing a RACH based SDT, performing a random access procedure, notifying a fail reason to an RRC layer, or entering an idle state.

In an embodiment, the retransmission of the SDT message and the first transmission of the SDT message have the same HARQ process ID.

FIG. 8 shows a flowchart of a process according to an embodiment of the present disclosure. The process may be used in a wireless network node (e.g. NW or gNB) and comprises the following step:

Step 801: Configure, to a wireless terminal, a timer for retransmitting an SDT message of an SDT.

In this embodiment, the wireless network configures a timer to the wireless terminal. This timer is associated with retransmitting an SDT message of an SDT.

In an embodiment, the SDT message may comprise at least one of:

an RRC message of initiating the SDT with the configured grant, or a data message of the SDT (i.e. the message comprising the data of the SDT).

In an embodiment, the timer starts when the SDT message is transmitted by using a configured grant.

In an embodiment, the timer stops when the wireless terminal receives at least one of a control channel in response to the SDT message or a control channel (configured) for performing the retransmission of the SDT message.

In an embodiment, the wireless network node further configures a counter to the wireless terminal, wherein the counter is increased by 1 each time of the timer expires or each time of the wireless terminal retransmitting the SDT message.

In an embodiment, the wireless network node further configures the maximum number of attempt times for retransmitting the SDT message.

FIG. 9 shows a flowchart of a process according to an embodiment of the present disclosure. The process shown in FIG. 9 may be used in a wireless terminal (i.e. UE) and comprises the following step:

Step 901: Prioritize a first UL transmission over a second UL transmission when a boundary transmission flag associated with the first UL transmission is configured and the boundary transmission flag associated with the second UL transmission is not configured.

In the process shown in FIG. 9, the boundary transmission flag is used to indicate whether a UL transmission associated with the boundary transmission flag is an important UL transmission. In this embodiment, the important UL transmission (or the boundary UL transmission) refers to the UL transmission configured to start at the boundary of an FFP period associated with the wireless terminal . When the boundary transmission flag associated with a first UL transmission is configured (e.g. set to bit "1"), the wireless terminal prioritizes the first UL transmission over a second UL transmission whose boundary transmission flag is not configured (e.g. set to bit "0"). Note that, the second UL transmission refers to an overlapping UL transmission whose duration overlaps the duration of the first UL transmission. In addition, the first UL transmission may have multiple overlapping UL transmissions (i.e. multiple second transmissions) and the first UL transmission would be prioritized over all the overlapping UL transmissions.

In an embodiment of the UL transmission corresponding to a configured UL grant (i.e. the UL grant received from the upper layer (e.g. RRC layer)), the boundary transmission flag of the UL transmission is comprised in the configured UL grant configuration.

In an embodiment of the UL transmission corresponding to a dynamic grant (i.e. the UL grant received from the lower layer (i.e. physical layer)), the boundary transmission flag of the UL transmission is comprised in downlink control information corresponding to this dynamic grant or UL transmission.

FIG. 10 shows a flowchart of a process according to an embodiment of the present disclosure. The process shown in FIG. 10 may be used in a wireless terminal (i.e. UE) and comprises the following step:

Step 1001: When a boundary transmission flag of a UL transmission is configured, always perform the UL transmission.

In FIG. 10, the boundary transmission flag is used to indicate whether a UL transmission associated with the boundary transmission flag is an important UL transmission. In this embodiment, the important UL transmission (or the boundary UL transmission) refers to the UL transmission configured to start at the boundary of a FFP period associated with the wireless terminal. When the boundary transmission flag associated with a UL transmission is configured (e.g. set to bit "1"), this UL transmission cannot be skipped. That is, when the boundary transmission flag associated with a UL transmission is configured, the UL transmission is always performed by the wireless terminal.

In an embodiment of the UL transmission corresponding to a configured UL grant (i.e. the UL grant received from the upper layer (e.g. RRC layer)), the boundary transmission flag of the UL transmission is comprised in the configured UL grant.

In an embodiment of the UL transmission corresponding to a dynamic grant (i.e. the UL grant received from the lower layer (i.e. physical layer)), the boundary transmission flag of the UL transmission is comprised in downlink control information corresponding to this dynamic grant or UL transmission.

FIG. 11 relates to a schematic diagram of a wireless terminal 110 according to an embodiment of the present disclosure. The wireless terminal 110 may be a user equipment (UE), a mobile phone, a laptop, a tablet computer, an electronic book or a portable computer system and is not limited herein. The wireless terminal 110 may include a processor 1100 such as a microprocessor or Application Specific Integrated Circuit (ASIC), a storage unit 1110 and a communication unit 1120. The storage unit 1110 may be any data storage device that stores a program code 1112, which is accessed and executed by the processor 1100. Embodiments of the storage unit 1112 include but are not limited to a subscriber identity module (SIM), read-only memory (ROM), flash memory, random-access memory (RAM), hard-disk, and optical data storage device. The communication unit 1120 may a transceiver and is used to transmit and receive signals (e.g. messages or packets) according to processing results of the processor 1100. In an embodiment, the communication unit 1120 transmits and receives the signals via at least one antenna 1122 shown in FIG. 11.

In an embodiment, the storage unit 1110 and the program code 1112 may be omitted and the processor 1100 may include a storage unit with stored program code.

The processor 1100 may implement any one of the steps in exemplified embodiments on the wireless terminal 110, e.g., by executing the program code 1112.

The communication unit 1120 may be a transceiver. The communication unit 1120 may as an alternative or in addition be combining a transmitting unit and a receiving unit configured to transmit and to receive, respectively, signals to and from a wireless network node (e.g. a base station).

Figure 12:
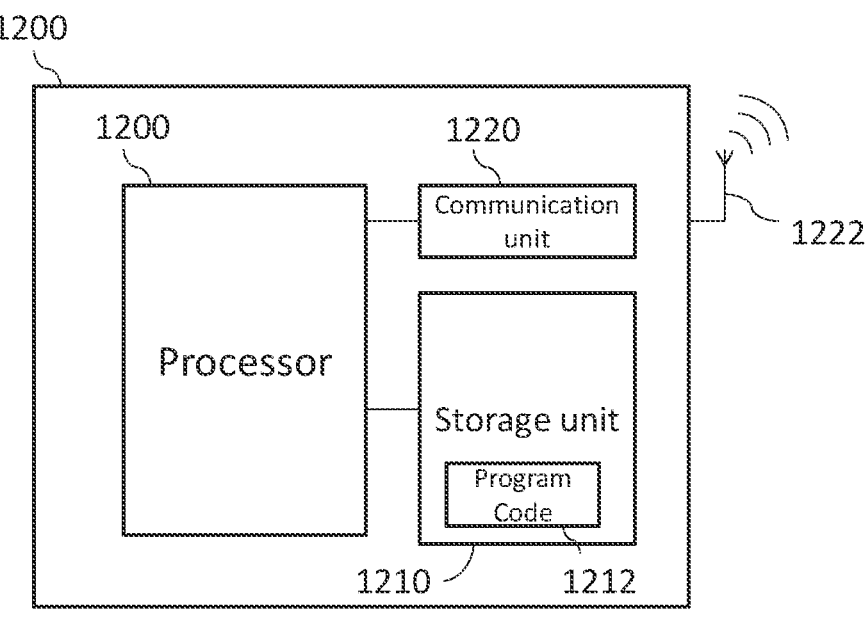
FIG. 12 shows an example of a schematic diagram of a wireless network node according to an embodiment of the present disclosure.

FIG. 12 relates to a schematic diagram of a wireless network node 120 according to an embodiment of the present disclosure. The wireless network node 120 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 120 may comprise (perform) at least one network function such as an access and mobility management function (AMF), a session management function (SMF), a user place function (UPF), a policy control function (PCF), an application function (AF), etc. The wireless network node 120 may include a processor 1200 such as a microprocessor or ASIC, a storage unit 1210 and a communication unit 1220. The storage unit 1210 may be any data storage device that stores a program code 1212, which is accessed and executed by the processor 1200. Examples of the storage unit 1212 include but are not limited to a SIM, ROM, flash memory, RAM, hard-disk, and optical data storage device. The communication unit 1220 may be a transceiver and is used to transmit and receive signals (e.g. messages or packets) according to processing results of the processor 1200. In an example, the communication unit 1220 transmits and receives the signals via at least one antenna 1222 shown in FIG. 12.

In an embodiment, the storage unit 1210 and the program code 1212 may be omitted. The processor 1200 may include a storage unit with stored program code.

The processor 1200 may implement any steps described in exemplified embodiments on the wireless network node 120, e.g., via executing the program code 1212.

The communication unit 1220 may be a transceiver. The communication unit 1220 may as an alternative or in addition be combining a transmitting unit and a receiving unit configured to transmit and to receive, respectively, signals to and from a wireless terminal (e.g. a user equipment).

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a wireless terminal, the method comprising:

determining whether a condition associated with using a configured uplink (UL) grant for retransmitting a small data transmission (SDT) message of an SDT is met, and retransmitting, to a wireless network node, the SDT message by using the configured UL grant when the condition is met, wherein the condition associated with using the configured grant for retransmitting the SDT message comprises that no acknowledge message corresponding to the SDT message is received before a first timer expires, wherein the condition associated with using the configured grant for retransmitting the SDT message comprises:

the SDT message has been transmitted by using the configured grant and has not been transmitted by using a dynamic grant scheduled with an identifier of the wireless terminal, wherein the first timer is configured per configured UL grant and associated with an HARQ process ID of the corresponding configured UL grant, wherein the first timer associated with an HARQ process ID starts when the SDT message is transmitted by using the configured UL grant associated with the HARQ process ID, and wherein the first timer associated with an HARQ process ID stops when the wireless terminal receives the acknowledge message or the non-acknowledge message in response to the SDT message transmission associated with the HARQ process ID.

2. The wireless communication method of claim 1, wherein the SDT message comprises at least one of:

a radio resource control message of the SDT, or a data message of the SDT.

3. The wireless communication method of claim 1, wherein the retransmission of the SDT message and the first transmission of the SDT message have the same HARQ process ID.

4. A wireless terminal, comprising:

a processor, configured to:

determine whether a condition associated with using a configured uplink (UL) grant for retransmitting a small data transmission (SDT) message of an SDT is met, and a communication unit, configured to:

retransmit, to a wireless network node, the SDT message by using the configured UL grant when the condition is met, wherein the condition associated with using the configured grant for retransmitting the SDT message comprises that no acknowledge message corresponding to the SDT message is received before a first timer expires, wherein the condition associated with using the configured grant for retransmitting the SDT message comprises:

the SDT message has been transmitted by using the configured grant and has not been transmitted by using a dynamic grant scheduled with an identifier of the wireless terminal, wherein the first timer is configured per configured UL grant and associated with an HARQ process ID of the corresponding configured UL grant, wherein the first timer associated with an HARQ process ID starts when the SDT message is transmitted by using the configured UL grant associated with the HARQ process ID, and wherein the first timer associated with an HARQ process ID stops when the wireless terminal receives the acknowledge message or the non-acknowledge message in response to the SDT message transmission associated with the HARQ process ID.

5. The wireless terminal of claim 4, wherein the SDT message comprises at least one of: a radio resource control message of initiating the SDT, or a data message of the SDT.

6. A wireless communication method for use in a wireless network node, the method comprising:

receiving, by a wireless network node, a retransmission of a small data transmission (SDT) message by using a configured uplink (UL) grant when a wireless terminal has determined that a condition associated with using the configured UL grant for retransmitting the SDT message of an SDT is met, wherein the condition associated with using the configured grant for transmitting the SDT message comprises that no acknowledge message corresponding to the SDT message is received before a first timer expires, wherein the condition associated with using the configured grant for retransmitting the SDT message comprises:

the SDT message has been transmitted by using the configured grant and has not been transmitted by using a dynamic grant scheduled with an identifier of the wireless terminal, wherein the first timer is configured per configured UL grant and associated with an HARQ process ID of the corresponding configured UL grant, wherein the first timer associated with an HARQ process ID starts when the SDT message is transmitted by using the configured UL grant associated with the HARQ process ID, and wherein the first timer associated with an HARQ process ID stops when the wireless terminal receives the acknowledge message or the non-acknowledge message in response to the SDT message transmission associated with the HARQ process ID.

7. The wireless communication method of claim 6, wherein the SDT message comprises at least one of:

a radio resource control message of the SDT, or a data message of the SDT.

8. The wireless communication method of claim 6, wherein the retransmission of the SDT message and the first transmission of the SDT message have the same HARQ process ID.

* * * * *